(12) United States Patent
Santos et al.

(10) Patent No.: US 9,434,486 B1
(45) Date of Patent: Sep. 6, 2016

(54) SYSTEM AND APPARATUS FOR DEPLOYING A SATELLITE

(71) Applicant: The United States of America as represented by the Administrator of the National Aeronautics and Space Administration, Washington, DC (US)

(72) Inventors: Luis H. Santos, Greenbackville, VA (US); John D. Hudeck, Pocomoke, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 515 days.

(21) Appl. No.: 13/781,121

(22) Filed: Feb. 28, 2013

Related U.S. Application Data

(60) Provisional application No. 61/748,814, filed on Jan. 4, 2013.

(51) Int. Cl.
 *B64G 1/64* (2006.01)
 *B64G 1/22* (2006.01)

(52) U.S. Cl.
 CPC ............... *B64G 1/64* (2013.01); *B64G 1/222* (2013.01)

(58) Field of Classification Search
 CPC ........ B64G 1/222; B64G 1/64; B64G 1/641; B64G 1/645
 See application file for complete search history.

(56) References Cited

U.S. PATENT DOCUMENTS

| | | | | |
|---|---|---|---|---|
| 2,226,717 A | * | 12/1940 | Haessler | B61D 23/02 105/427 |
| 3,096,571 A | * | 7/1963 | Koch | 29/897.15 |
| 3,144,956 A | * | 8/1964 | Anderson | B01J 3/03 220/316 |
| 4,473,201 A | * | 9/1984 | Barnes et al. | 244/129.5 |

* cited by examiner

*Primary Examiner* — Nicholas McFall

(57) ABSTRACT

A frictionless satellite constraint system is provided. The constraint system includes at least one clamp bar configured to restrain a satellite within the constraint system in an axial direction. The constraint system also includes a plurality of pins configured to restrain the satellite within the constraint system in a lateral direction.

17 Claims, 20 Drawing Sheets

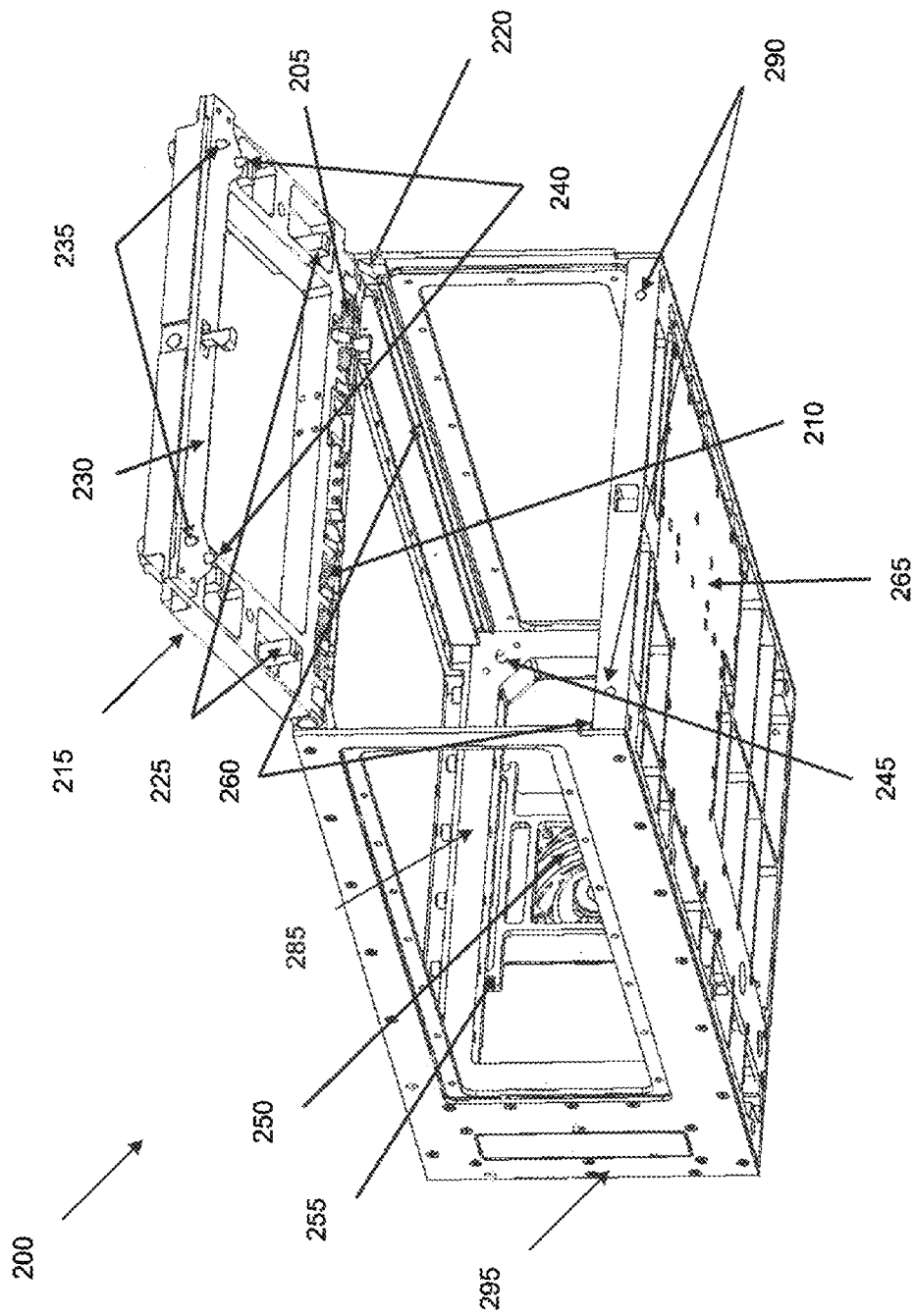

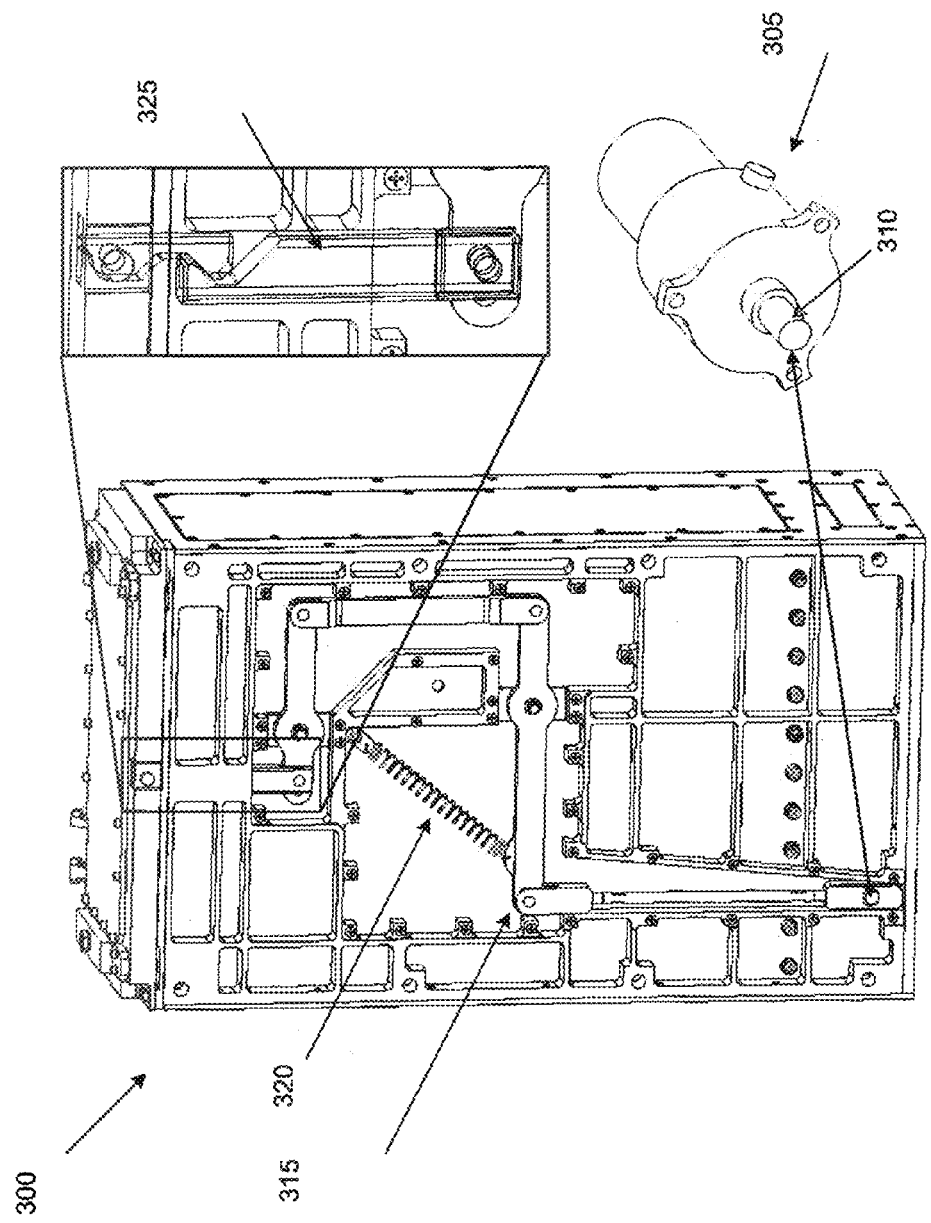

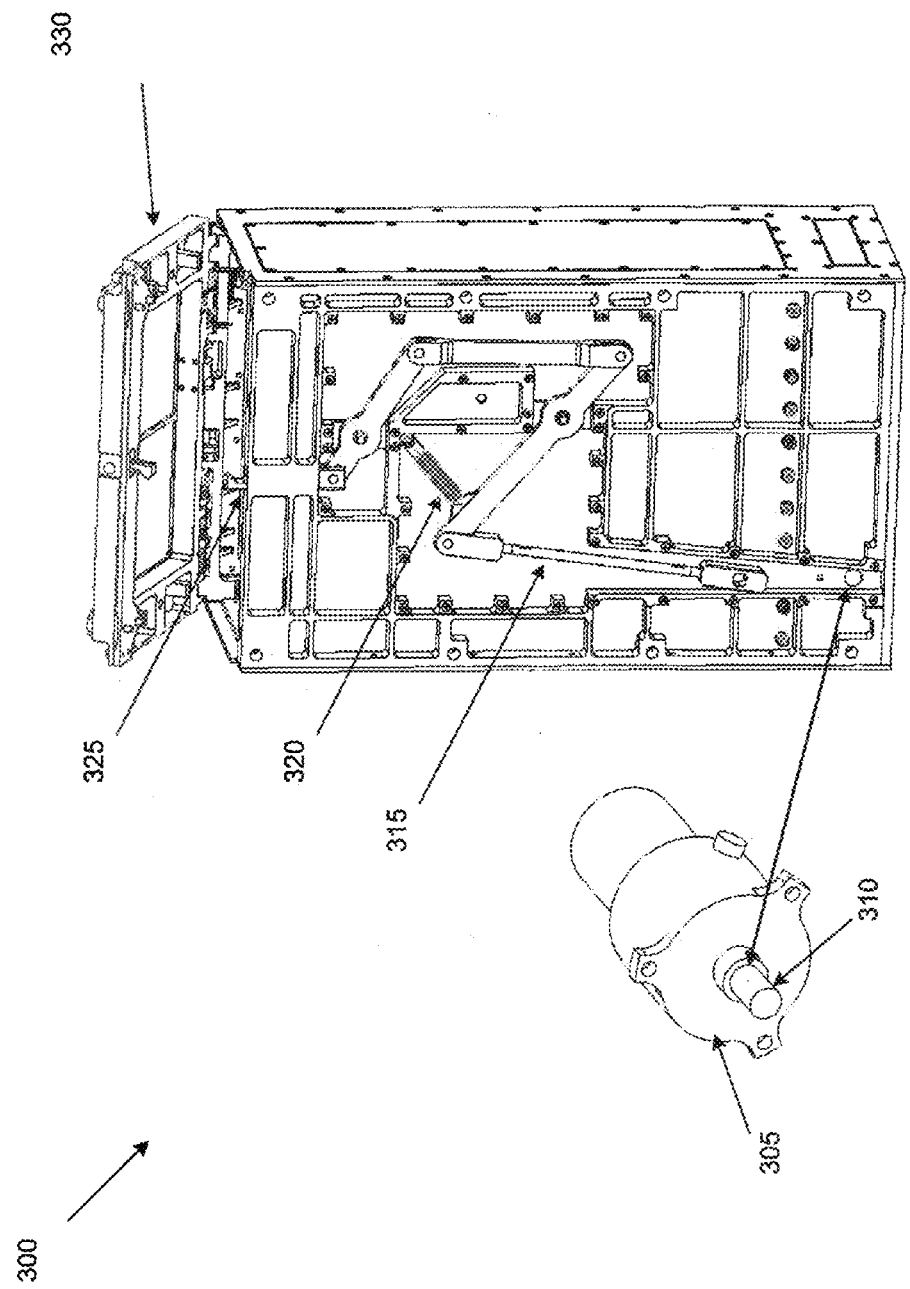

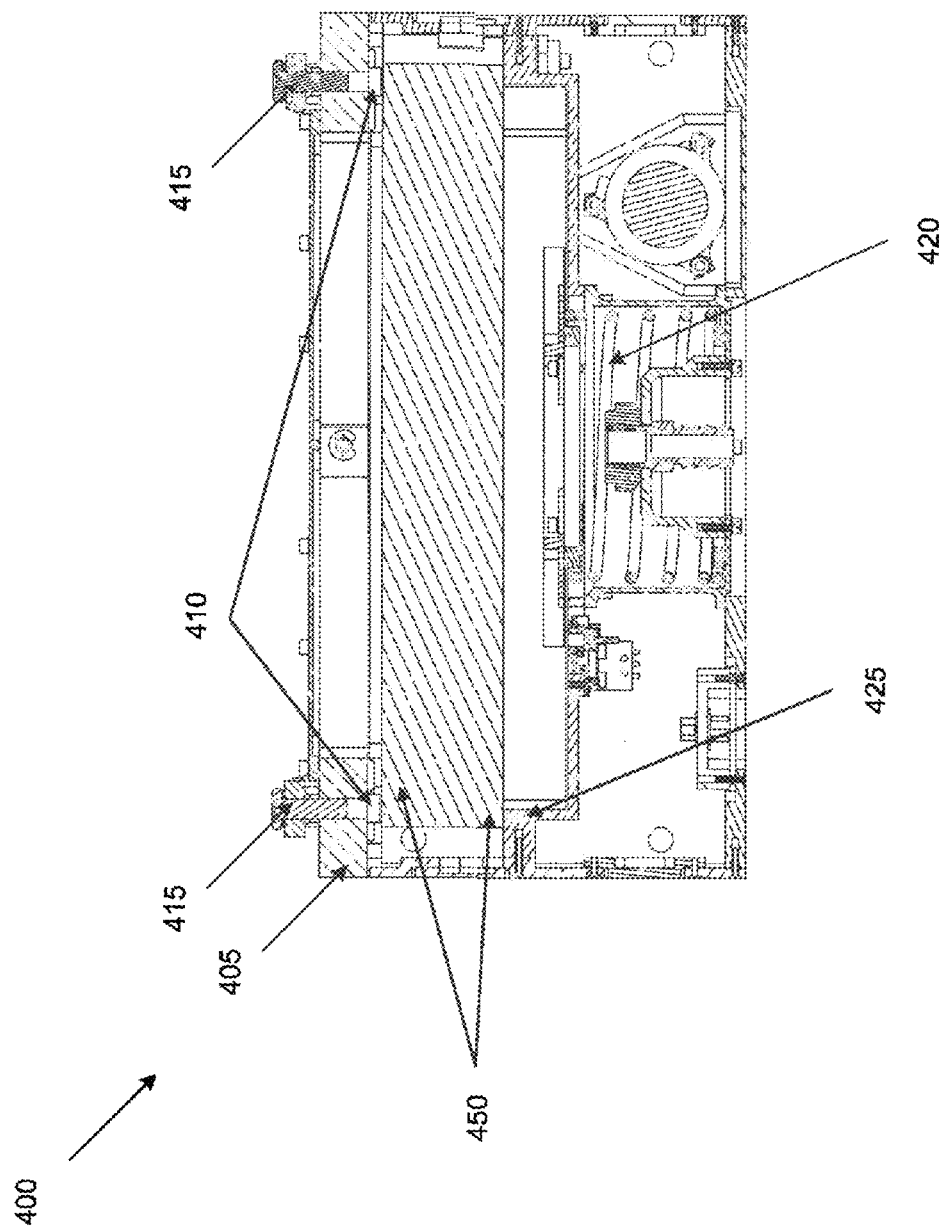

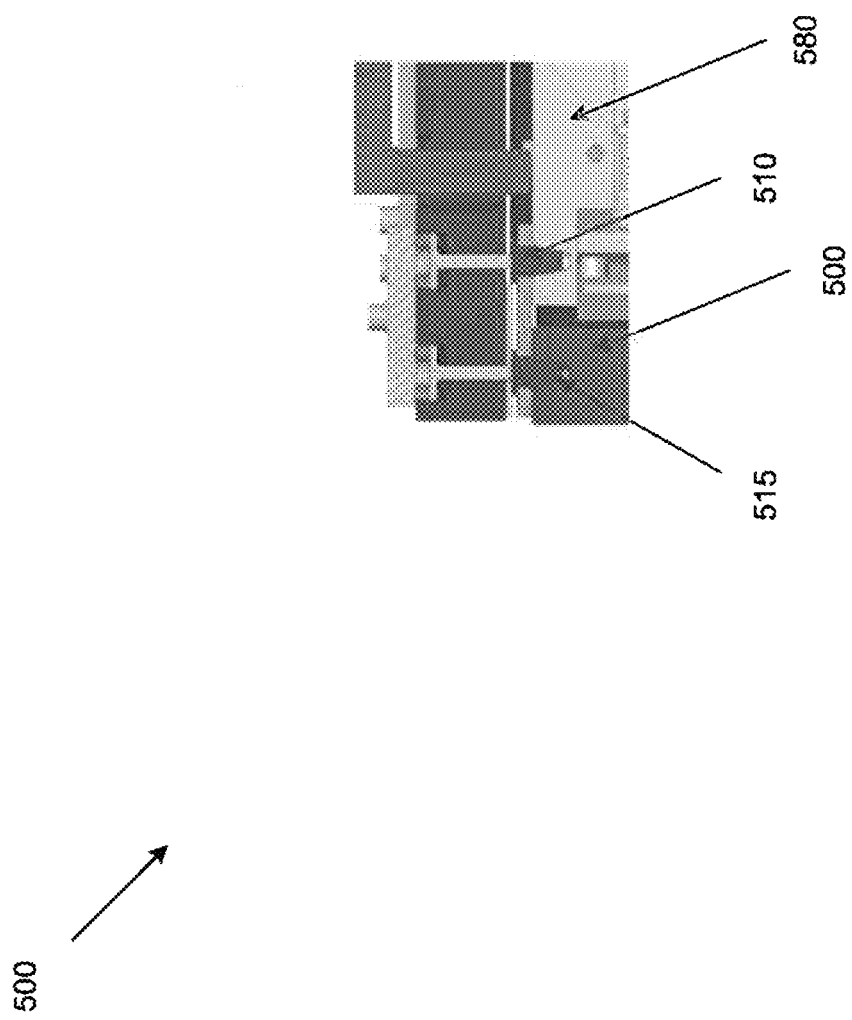

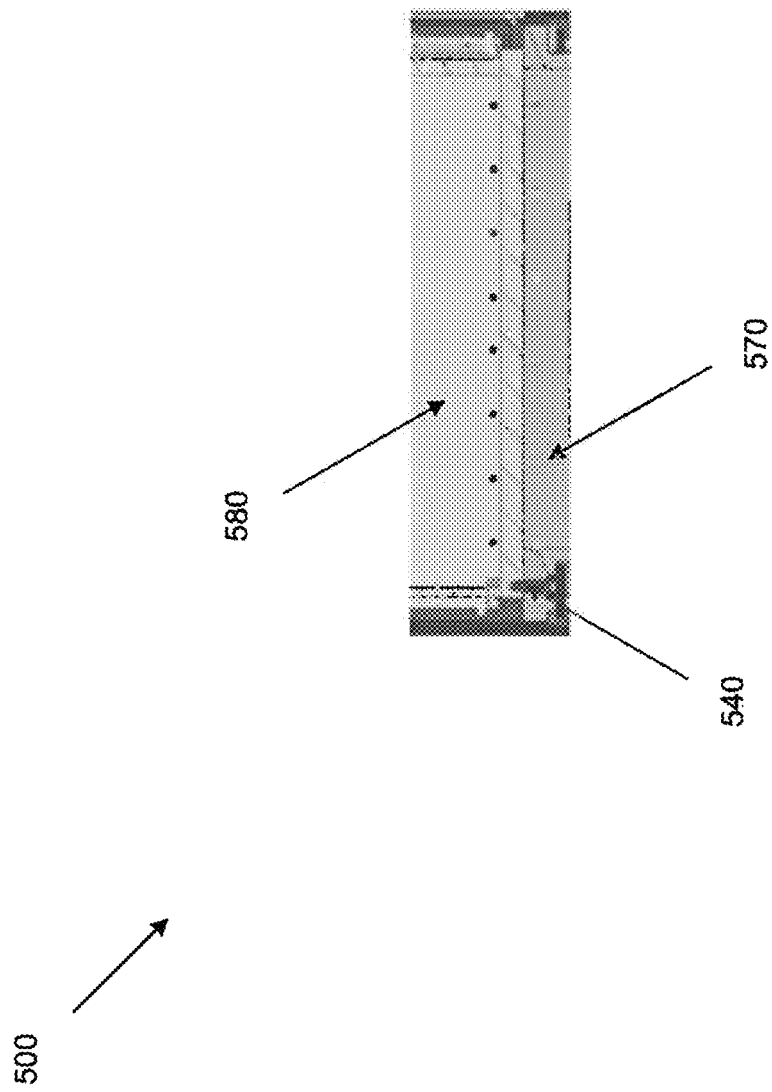

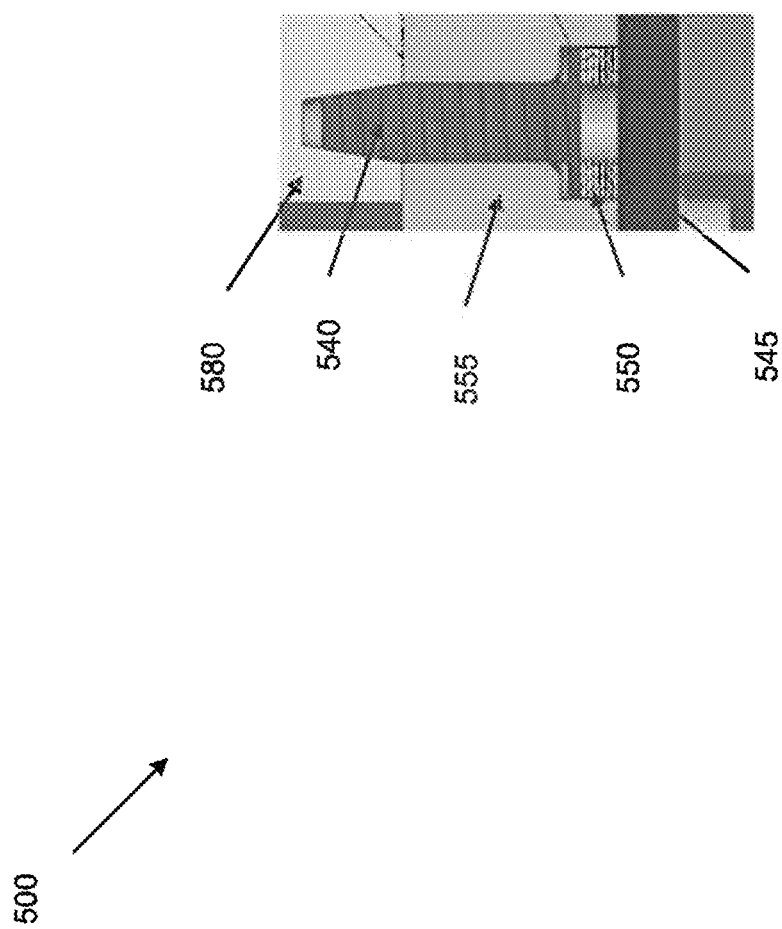

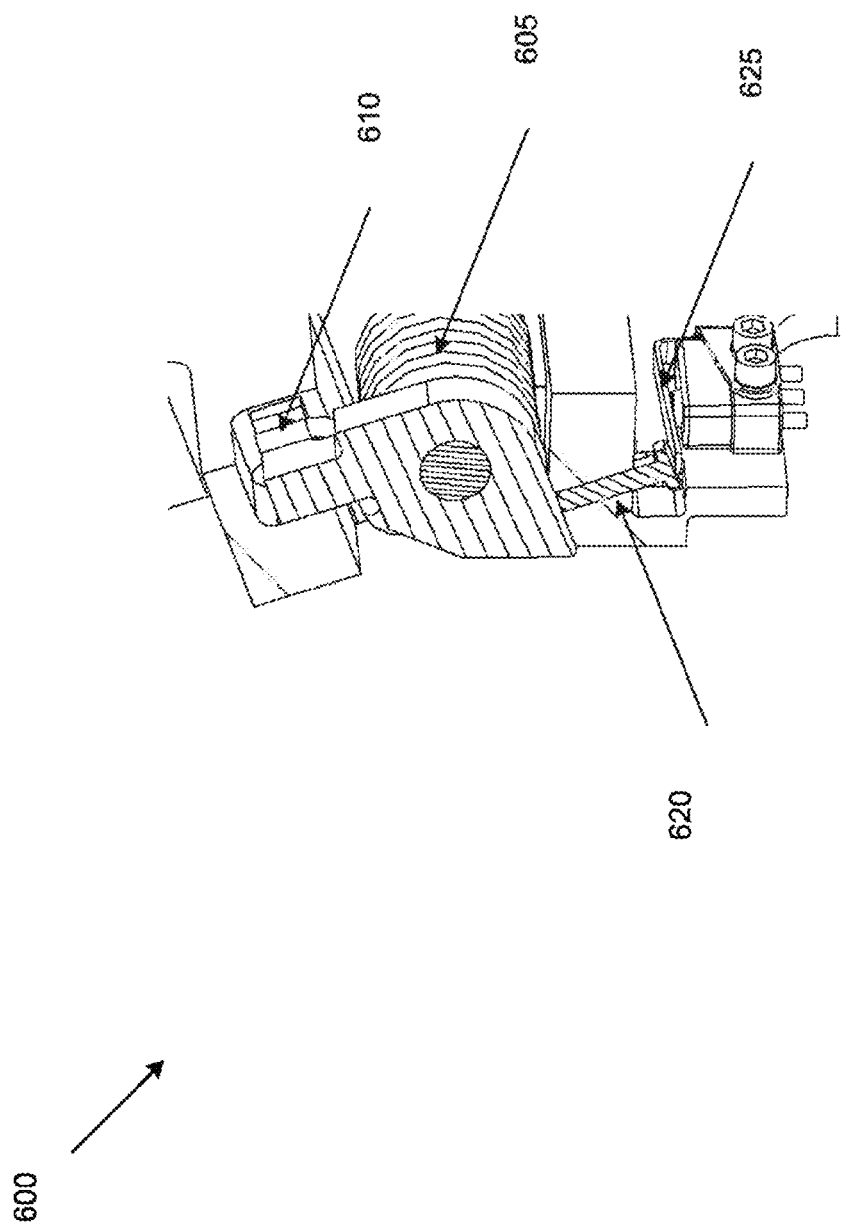

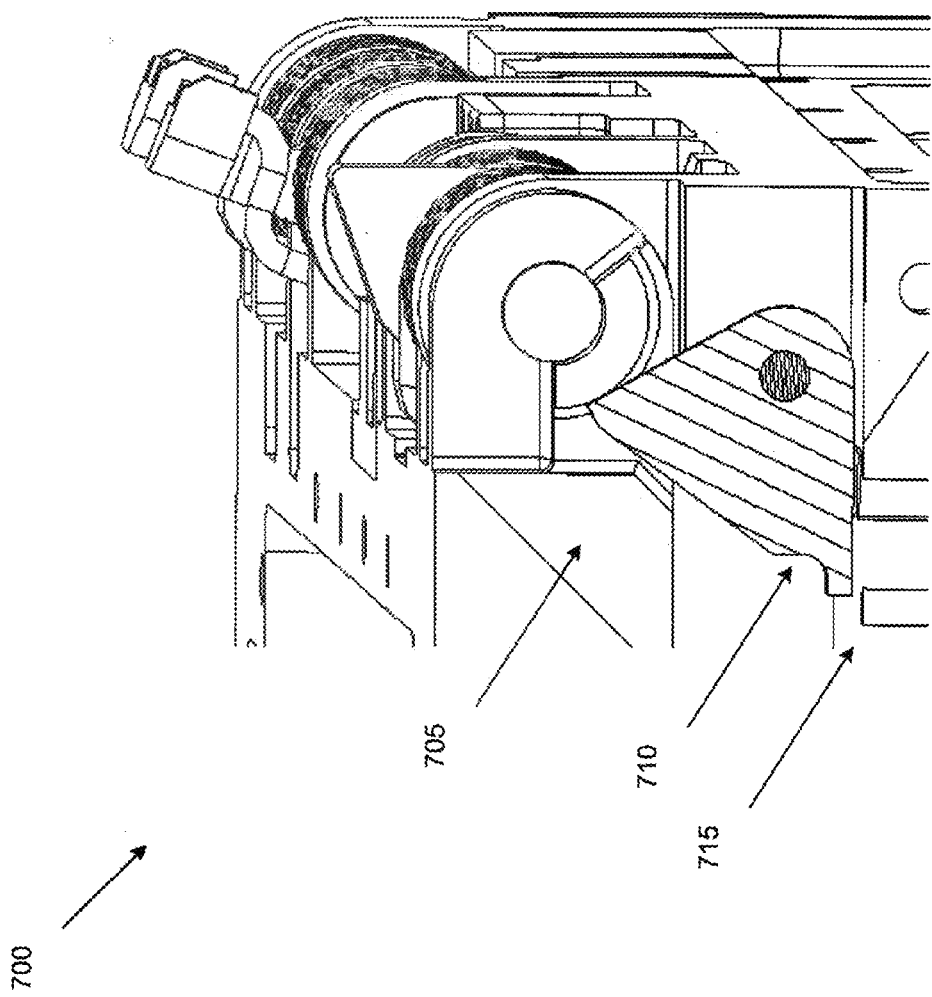

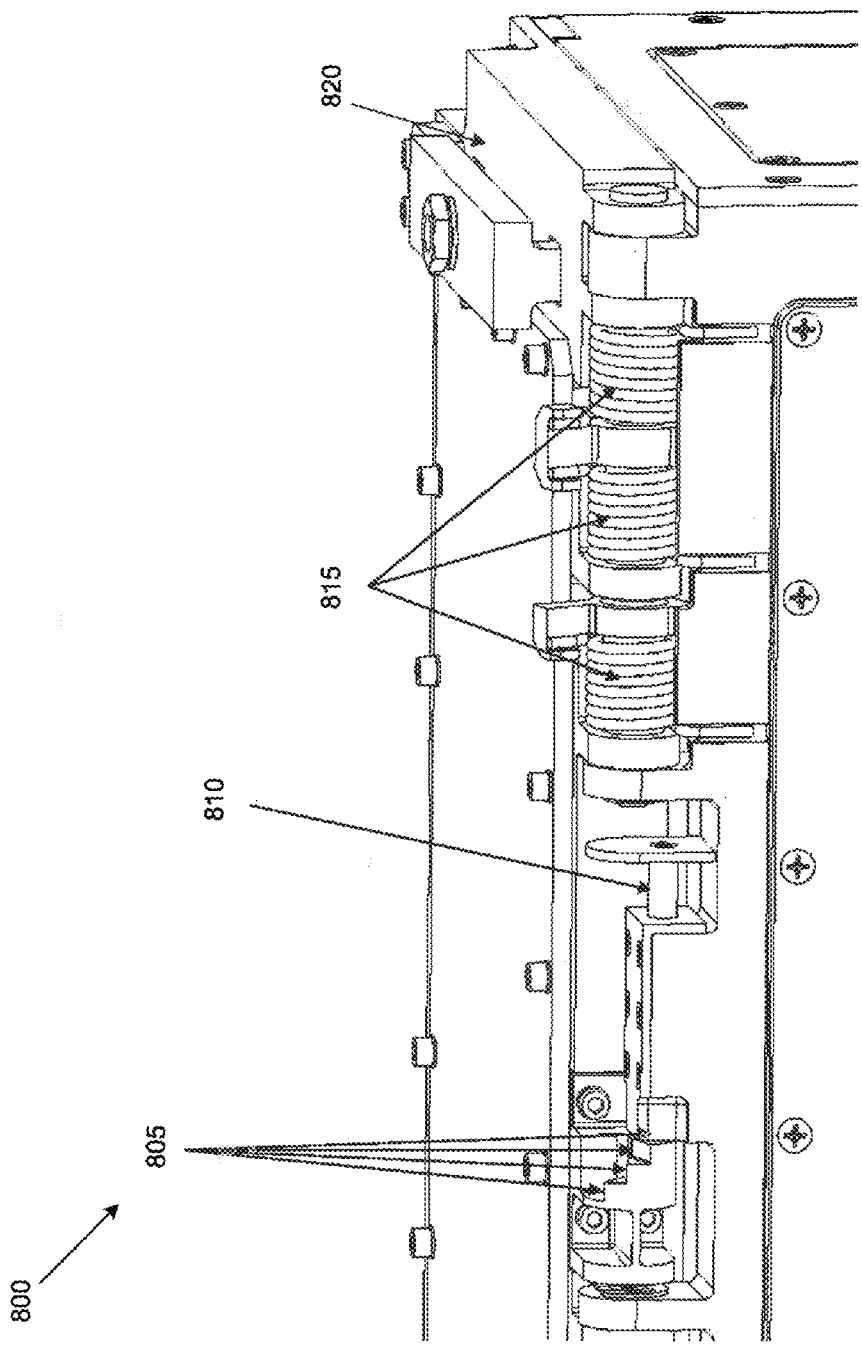

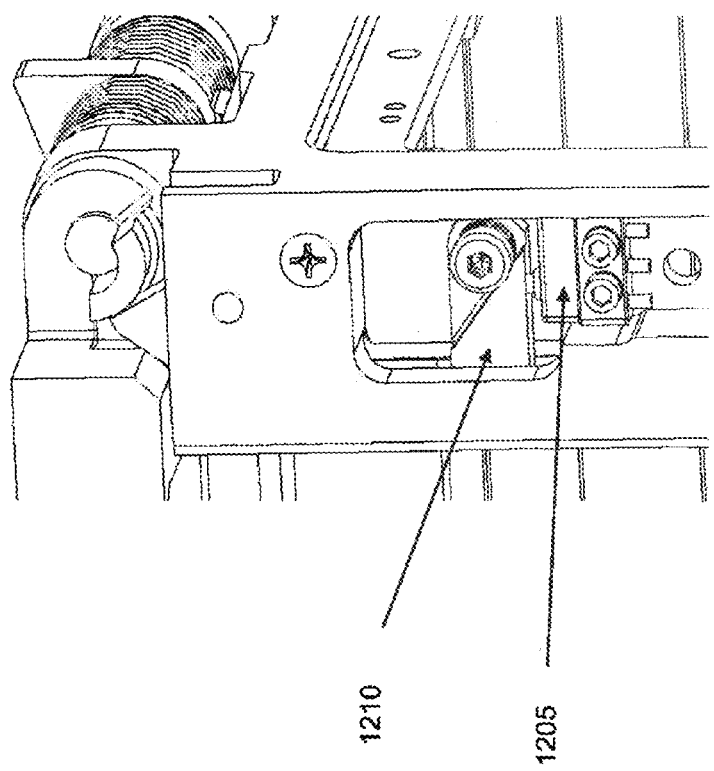

SYSTEM AND APPARATUS FOR DEPLOYING A SATELLITE

ORIGIN OF THE INVENTION

The invention described herein was made by an employee of the United States Government and may be manufactured and used by or for the Government for Government purposes without the payment of any royalties thereon or therefore.

FIELD

The present invention relates to a satellite deployment system and, more particularly, to a satellite deployment system that provides a more secure constraint interface during launch and an efficient guided ejection.

BACKGROUND

Current satellite deployers, such as a Poly Picosatellite Orbital Deployer (P-POD), use four corner rails to constrain a satellite prior to ejection. However, such satellite deployers fail to provide a tight preloaded satellite constraint mechanism, causing the satellite to rattle and move during launch. This may cause damage to the satellite.

There has been a push to provide a 6-unit CubeSat deployer, which is approximately double the size of a standard 3-unit deployer, referred to as a P-POD, for example. However, some of the current 6-unit deployer designs use the same four corner rail system to constrain the satellite as the P-POD, causing the satellite to rattle under the launch dynamic loading environment. Other 6-unit deployers use a clamping technique along the edges of the satellite. Such a clamping technique relies on friction, which can be difficult to control and predict, to constrain the satellite. However, when loads are high in the non-clamp direction, friction can be overcome and allow the satellite to move or rattle. Accordingly, a system and apparatus for deploying a satellite without the use of friction and four rails may be beneficial.

SUMMARY

Certain embodiments of the present invention may provide solutions to the problems and needs in the art that have not yet been fully identified, appreciated, or solved by current satellite deployment systems. For example, some embodiments pertain to a satellite deployment system that uses clamps in the axial direction with a preload and pins in the lateral direction with a preload to constrain the satellite. Thus, the satellite deployment system described herein is a frictionless system.

In accordance with an embodiment of the present invention, an apparatus is provided. The apparatus includes at least one clamp bar configured to restrain a satellite within the apparatus in an axial direction. The apparatus also includes a plurality of pins configured to restrain the satellite within the apparatus in a lateral direction.

In another embodiment of the present invention, an apparatus is provided. The apparatus includes a plurality of clamp bars with a preload configured to constrain a satellite within the apparatus in an axial direction. The apparatus also includes a plurality of upper and lower pins with a preload configured to constrain the satellite within the apparatus in a lateral direction.

In yet another embodiment of the present invention, an apparatus is provided. The apparatus includes a door. The door includes a first set of torsion springs and a second set of torsion springs. The first set of torsion springs is configured to open the door to a predefined angle and the second set of torsion springs is configured to slow the door and assist in bringing the door to rest. The apparatus also includes a compartment configured to hold the satellite.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates a deployer, according to an embodiment of the present invention.

FIGS. 3A and 3B illustrate a release mechanism of a deployer in a lock state and an unlock state, according to an embodiment of the present invention.

FIG. 4 is a cropped, cross sectional view illustrating an upper and lower section of deployer having an axial constraint system, according to an embodiment of the present invention.

FIGS. 5A through 5E illustrate a lateral constraint system of a deployer, according to an embodiment of the present invention.

FIG. 6 illustrates a deployment door hinge switch of a deployer, according to an embodiment of the present invention FIGS. 7A and 7B illustrate a two stage deployment system of a deployer, according to an embodiment of the present invention FIG. 8 illustrates a door stop system of a deployer, according to an embodiment of the present invention.

FIGS. 12A and 12B illustrate a rail switch system for the deployer, according to an embodiment of the present invention.

DETAILED DESCRIPTION OF THE EMBODIMENTS

One or more embodiments pertain to a deployer configured to provide a secure constraint interface during launch and an efficient guided ejection, while permitting a less restrictive inner volume. For example, the deployer may include a door and a release mechanism. When the door is closed, the satellite is constrained within a satellite holding compartment of the deployer.

A preload is applied to the door to clamp the satellite in an axial direction. For example, at least two clamps are used to clamp the satellite axially to prevent the satellite from moving in the axial direction. However, it should be appreciated that a single clamp bar may also be used to prevent the satellite from moving in the axial direction. At least six shear pins are used to prevent the satellite from moving in the lateral direction. The deployer also utilizes four pins at one end of the deployer and another two pins at the other end of the deployer. Two of the four pins are inserted into the deployer, and the other two of the four pins are inserted into the satellite. The four pins are connected via a shear plate that is attached to the door. The two pins at the other end of the deployer are inserted through the deployer and into the satellite. Each of the pins are tapered and preloaded to prevent them from moving out of position in their axial direction.

In order for the satellite to be ejected, the release mechanism includes a pin puller configured to remove a pin causing the door to open. A first set of torsion springs are configured to open the door up to a predefined degree (or angle). After the door reaches to the predefined degree (e.g., 110 degrees), a satellite lock is configured to release the satellite. A second set of torsion springs is configured to reduce the rate at which the door opens after the door reaches the predefined degree. This prevents the door from swinging open or closed, causing damage to the satellite.

The deployer may also include a series of sensors (or switches) configured to provide an indication that the door has opened, that the satellite is being, or has been, released from the deployer, etc. A more detailed explanation of the embodiments is provided below.

Figure 1A:
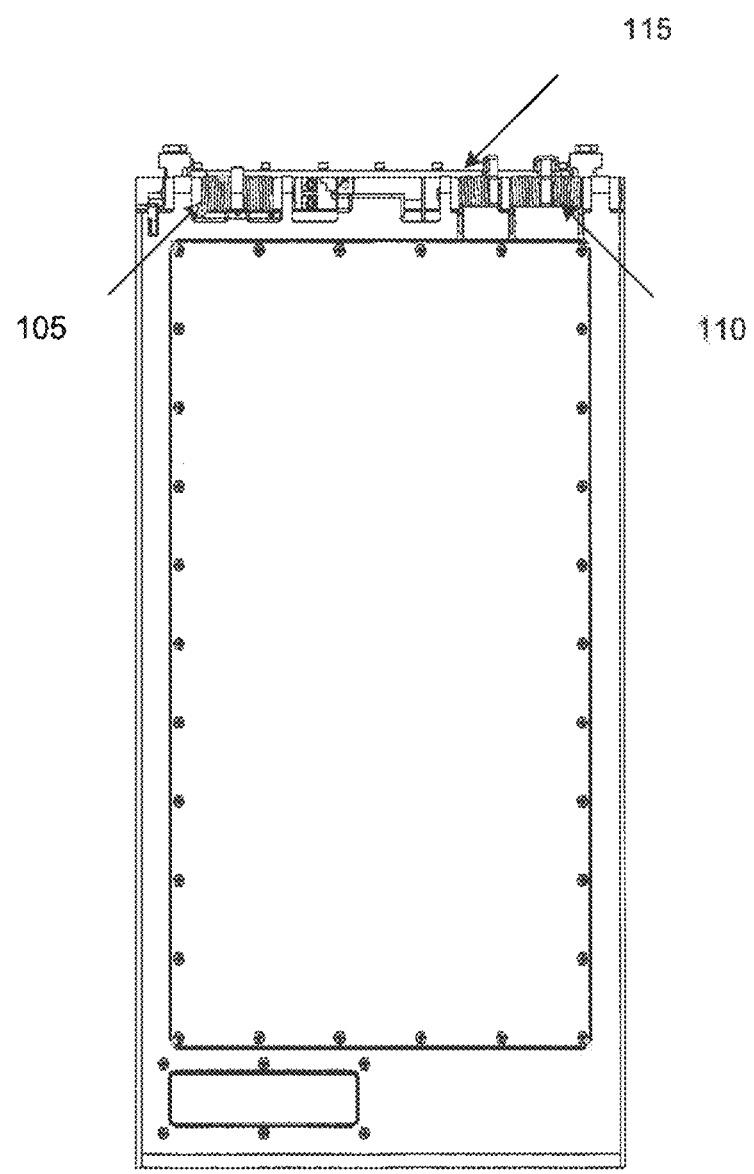
FIGS. 1A and 1B illustrate a first view and a second view of a deployer, according to an embodiment of the present invention.
Figure 1B:
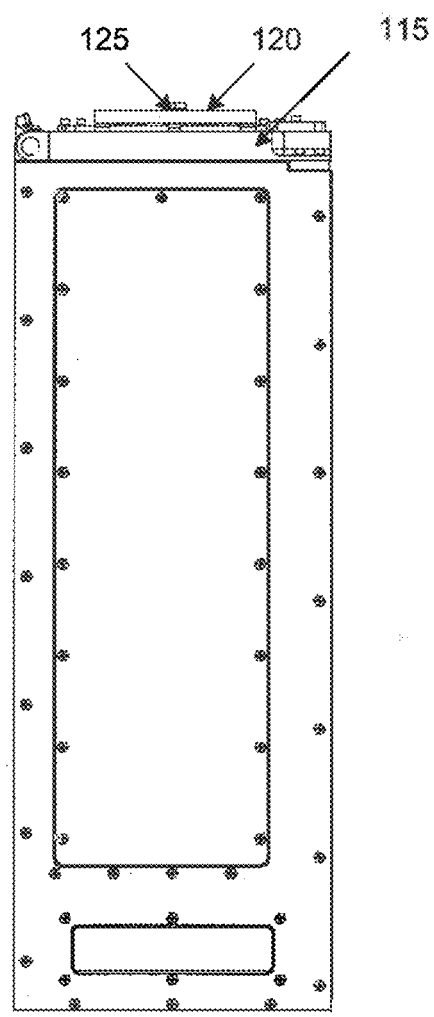

FIGS. 1A and 1B illustrate a first view and a second view of a deployer 100, according to an embodiment of the present invention. In this embodiment, a first set of torsion springs 105 may open door 115 and a second set of torsion springs 110 may reduce the rate at which door 115 opens after door 115 is opened to a predefined degree or angle.

Because first set of torsion springs 105 may be active up to the predefined degree, second set of torsion springs 110 is used to prevent door 115 from quickly opening and/or closing, causing damage to the satellite. In this embodiment, second set of torsion springs 110 is activated after door 115 reaches the predefined degree. For example, after door 115 opens to 110 degrees, second set of torsion springs 110 is activated to reduce the rate at which door 115 opens. However, it should be appreciated that second set of torsion springs 110 may be activated at any degree that would be appreciated by a person of ordinary skill in the art. It should be appreciated that a ratchet system (or a series of locks) may be used in this embodiment in conjunction with second set of torsion springs 110, such that at every predefined number of degrees (in this case, 30 degrees), door 115 is prevented from bouncing back further than the previous lock permits (i.e., no more than 30 degrees at most). It should be appreciated that the door can be prevented from bouncing back at any predefined number of degrees. See, for example, FIG. 8.

Also shown in this embodiment is clamp bar 120 having a bolt 125 configured to provide a preload such that clamp bar 120 may clamp or constrain the satellite in the axial direction. Bolt 125 in this embodiment has load cells that help measure the amount of preload that is placed on the satellite. See, for example, FIG. 4.

FIG. 2 illustrates a deployer 200, according to an embodiment of the present invention. Deployer 200 includes a door 215 and a satellite holding compartment 295. As discussed above, a first set of torsion springs 205 may open door 215 up to a predefined degree, after which a second set of torsion springs 210 is activated to reduce the speed at which door 215 opens. Also, in this embodiment, when door 215 reaches the predefined degree, a satellite lock 220 is configured to unlock the satellite (See FIGS. 7A and 7B), allowing a linear spring 250 to expand and causing pusher plate 255 to push the satellite out of deployer 200. It should be noted that the satellite is configured to rest (or be placed) on a contact surface 285 of deployer 200 when preloaded. Pusher plate 255 may also in some embodiments contact the satellite at four points. For example, while the system is preloaded, pusher plate 255 contact is due to linear spring 250 pushing against the satellite. When the satellite is deployed from deployer 200, guide rails 260 are configured to guide the satellite out of deployer 200. By using two guide rails versus four guide rails, as is commonly used conventionally, more external space for the satellite can be realized in deployer 200. It should be appreciated that guide rails 260 are placed opposite to one another in this embodiment.

Clamp bar 225 includes a bolt (see FIG. 1B, element 125) to allow clamp bar 225 to clamp or push the satellite down to contact surface 285, such that the satellite is prevented from moving in the axial direction. Stated differently, the bolt applies a force to clamp bar 225 to allow clamp bar 225 to exert a force on the satellite, such that the satellite is pushed down on to a contact surface 285 of deployer 200. An illustration can be seen in FIG. 4A.

Also connected to door 215 is shear plate 230. Shear plate 230 includes four pins, i.e., a set of deployer shear pins 235 and a set of upper satellite shear pins 240. Set of deployer shear pins 235 is configured to connect shear plate 230 to inlets 290 of satellite holding compartment 295 of deployer 200 when door 215 is closed. It should be appreciated that set of deployer shear pins 235, set of upper shear pins 240, and set of lower satellite shear pins 245 are configured to constrain the satellite in the lateral direction during a launch. It should be appreciated that as door 215 opens, shear plate 230 is configured to pull set of upper deployer pins 235 and set of upper satellite pins 240 out of deployer 200 (e.g., inlets 290 of satellite holding compartment 295) and the satellite, respectively. In particular, set of lower satellite shear pins 245 in this embodiment protrudes out from a contact surface 285 of deployer 200 and into the satellite. It should be appreciated that pusher plate 255 and spring 250 may act to disengage the satellite from set of lower satellite shear pins 245.

When door 215 is opened via first set of torsion springs 205, the axial preload is removed and set of deployer shear pins 235 and set of upper shear pins 240 are extracted from inlets 290 and the satellite. With the axial constraint removed, the pusher plate 255 may then deploy the satellite from deployer 200 after door 215 reaches the predefined degree. As the satellite is released from deployer 200, pusher plate 255 separates the satellite from set of lower shear pins 245, no longer constraining the satellite in the lateral direction.

In order to open door 215, a release mechanism (not shown) is provided. In this embodiment, a release mechanism plate 265 is provided to cover and contain the release mechanism system.

FIGS. 3A and 3B illustrate a release mechanism of a deployer 300 in a lock state and an unlock state, according to an embodiment of the present invention. In FIG. 3A, for example, the release mechanism includes a pin puller 305 and a latch (or jaw) 325 connected via mechanical linkages 315. It should be appreciated that in certain embodiments an electrical signal provided by the launch vehicle may activate pin puller 305 to pull pin 310. When pin puller 305 is activated, pin 310 is retracted and the system preload drives mechanical linkages 315 to move and release latch 325. When latch 325 is released, latch 325 releases door 330, as shown in FIG. 3B.

FIG. 4 illustrates an upper and lower section of deployer 400 having an axial constraint system, according to an embodiment of the present invention. In this embodiment, satellite 450 is constrained within deployer 400 using a set of clamp bars 410 and a lower contact surface 425. In this embodiment, a bolt 415 is used for each clamp bar 410 to compress satellite 450 against lower contact surface 425 of deployer 400 when door 405 is closed. This allows satellite 450 to be constrained in the axial direction. As satellite 450 is compressed against lower contact surface 425, spring 420 is compressed.

Figure 5A:
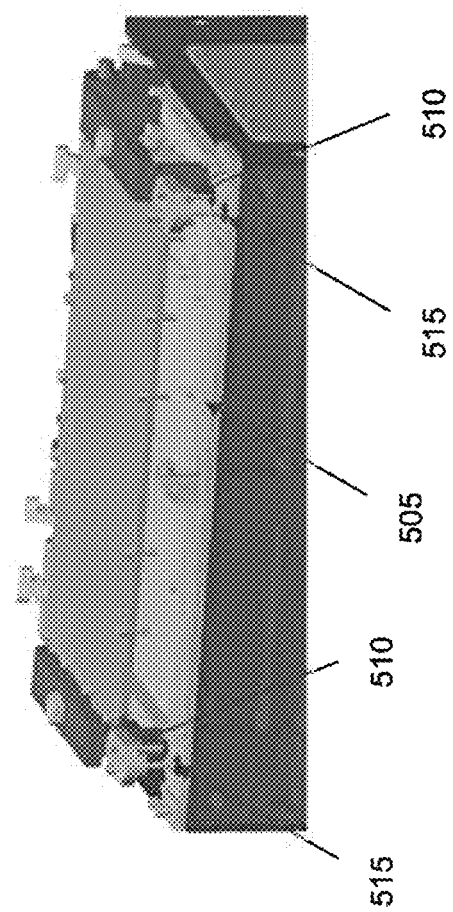

FIGS. 5A through 5E illustrate a lateral constraint system of a deployer 500, according to an embodiment of the present invention. In FIG. 5A, door 505 includes four pins, that is, a set of upper satellite pins 511) and a set of deployer pins 515. See also FIG. 5C. By inserting set of upper satellite pins 510 and set of deployer pins 515 in satellite 580 and deployer 500, respectively, if satellite 580 attempts to move during flight, force from satellite 580 is transferred to set of upper satellite pins 510 and then to deployer pins 515, preventing satellite 580 from moving in the lateral direction. This allows deployer 500 to prevent satellite 580 from g during flight.

Figure 5B:
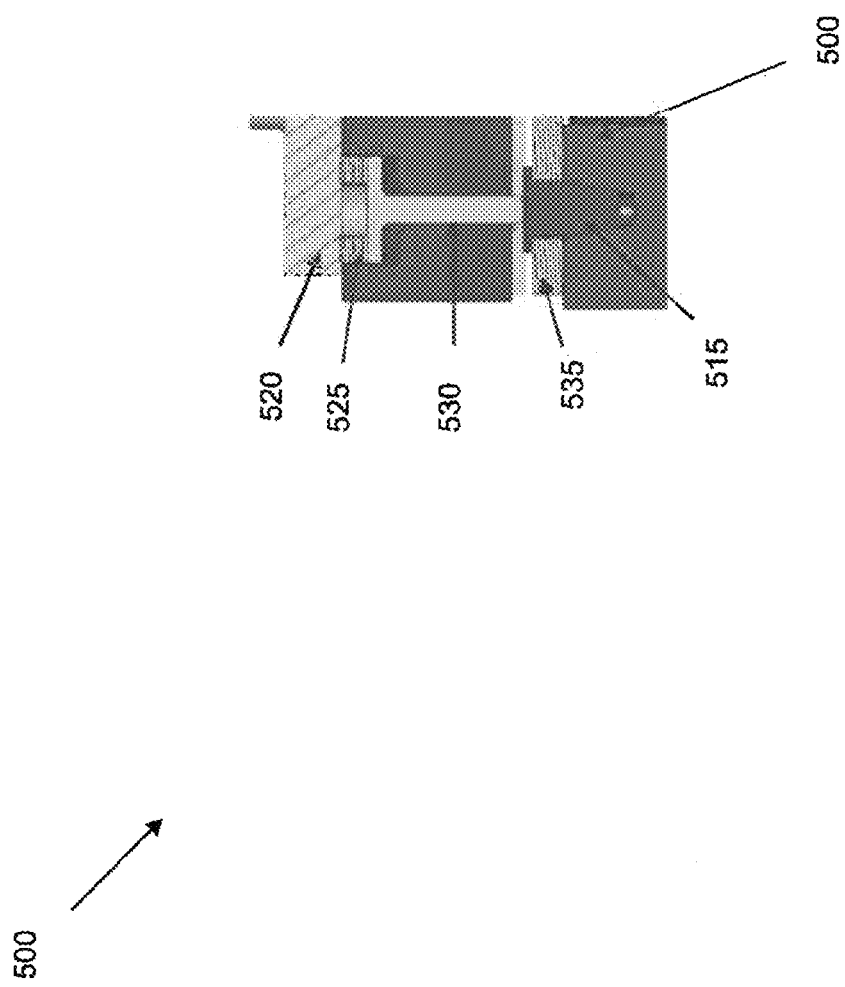

In order to preload set of deployer pins 515 into deployer 500, a pushing plate 520, Belleville washer stack 525, pushing pin 530 are utilized. See, for example, FIG. 5B. As shown in FIG. 5B, set of deployer pins 515 may protrude through shear plate 535. It should also be appreciated that pushing plate 520, Belleville washer stack 525, pushing pin 530 may reside in the door of deployer 500. A similar configuration may be utilized to preload set of upper satellite pins 510 into satellite 580.

Also utilized are a set of lower satellite pins 540 that protrude through lower plate 570 and into satellite 580, further restraining satellite 580 from moving in the lateral direction. See FIG. 5D. In this embodiment, lower satellite pins 540 are inserted through lower plate 555 and into the satellite 580. Pusher plate 545 and a Belleville washer stack 550 close out lower satellite pin 540 and act to apply a preload. See FIG. 5E. In some embodiments, set of upper and lower satellite pins 515, 540 are angled to allow the pins to protrude out more easily. It should be appreciated that Belleville washer stack 550 and Belleville washer stack 525, act as a preload to prevent set of lower satellite pins 540 and set of upper satellite pins 515 from moving out of the satellite.

FIG. 6 illustrates a deployment door hinge switch 600, according to an embodiment of the present invention. As discussed in FIGS. 1 and 2, a first set of torsion springs 605 is configured to open the door and, in particular, first set of torsion springs 605 pushes a bracket 610, causing the door of the deployer to open. In this embodiment, when the door opens up to a predefined degree, bracket 610 pushes down pin 620 until pin 620 is stopped by the deployer structure (not labeled). Pin 620 presses down on switch 625 and is held in position by first set of torsion springs 605.

When switch 625 is pressed in the "on" position, switch 625 provides a signal to indicate that the door has opened to a predefined degree (e.g., 110 degrees) and that the door is clear for the satellite to exit.

Figure 7B:
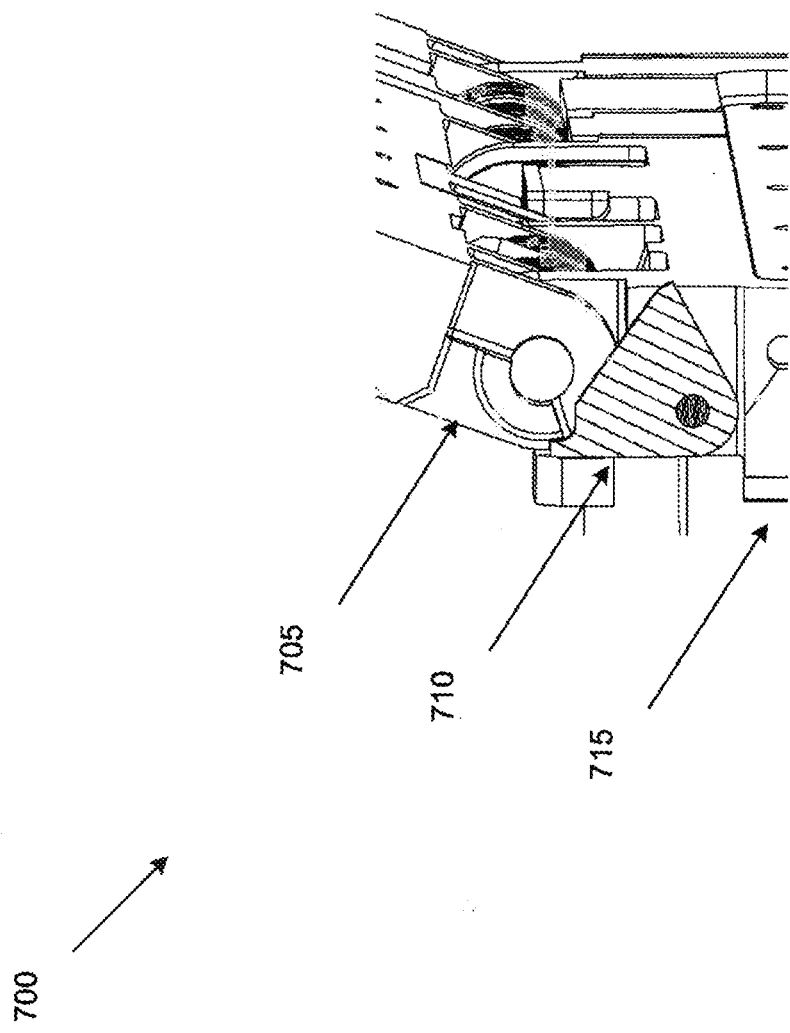

FIGS. 7A and 7B illustrate a two stage deployment system of a deployer 700, according to an embodiment of the present invention. In this embodiment, a satellite lock 710 is used to prevent the satellite from deploying when door 705 initially opens. FIG. 7A shows satellite lock 710 in a locked state, and held in place by a surface of door 705. Also shown in FIG. 7A is satellite 715 being held by satellite lock 710 upon door 705 beginning to open. Once door 705 begins to open, satellite 715 engages satellite lock 710 until a predefined degree is reached.

FIG. 7B shows satellite lock 710 in an unlock state, allowing satellite 715 to be released from the deployer. As discussed above, when door 705 reaches a predefined degree, such as 110 degrees, satellite lock 710 is configured to rotate, allowing satellite 715 to be released from deployer 700.

FIG. 8 illustrates a door stop system of a deployer 800, according to an embodiment of the present invention. The door stop system is configured to prevent door 820 from closing and contacting the satellite when the satellite is being deployed. In this embodiment, the door stop system includes ratchet fitting 805 and a spring loaded rod 810 that is configured to engage ratchet fitting 805 after second set of torsion springs 815 starts to act on door 820. For example, while second set of torsion springs 815 continues to slow down door 820, spring loaded rod 810 engages the ratchet fitting 805 every 30 degrees after door 820 has opened to 110 degrees. In this case, at each 30 degree step, spring loaded rod 810 prevents the door from being able to close back CM the exiting satellite. It should be appreciated that in other embodiments, ratchet fitting 805 may be configured to lock every time a predefined angle is passed to prevent the door from closing.

Figure 9:
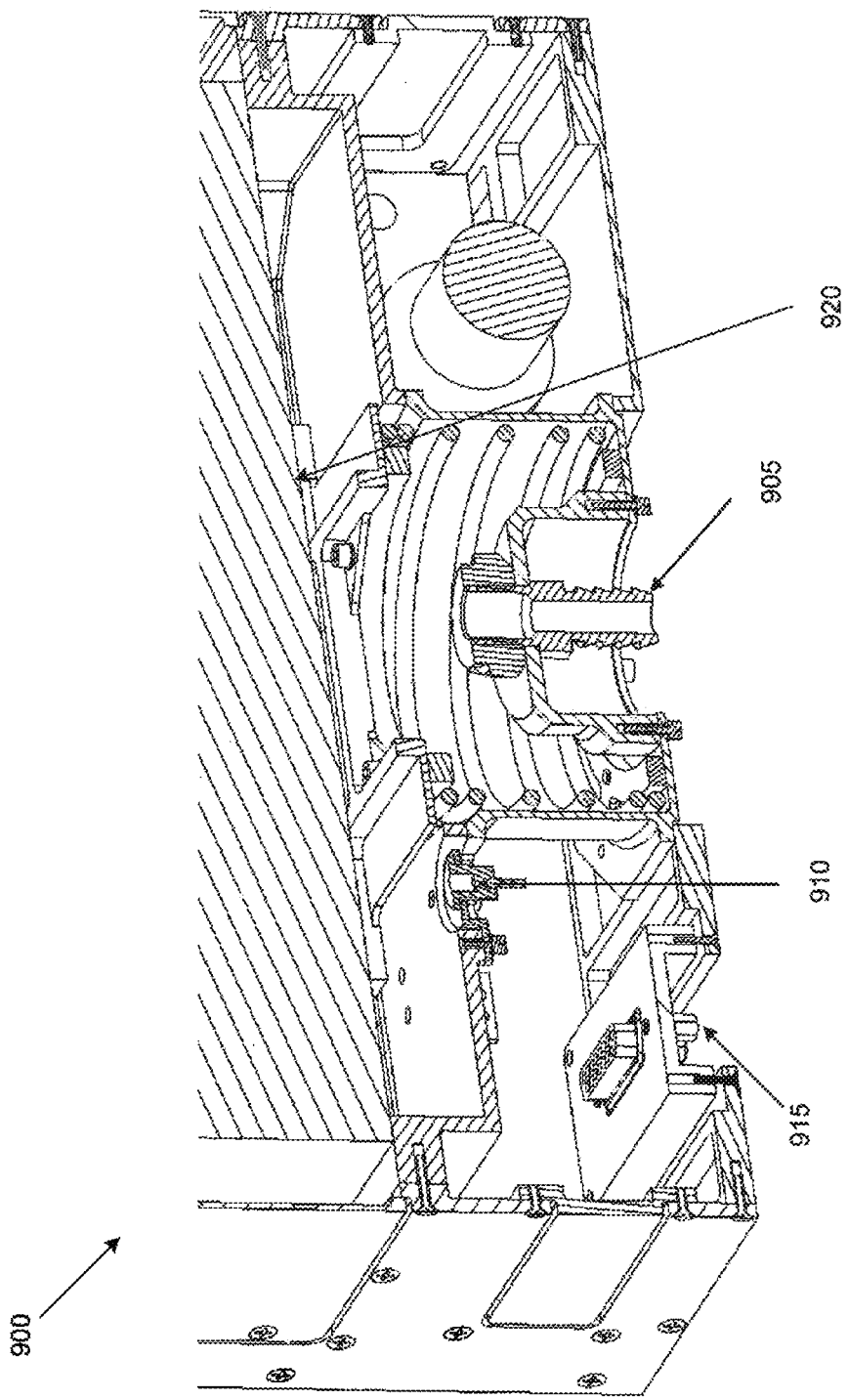
FIG. 9 illustrates a quick disconnect electrical and nitrogen purge system of a deployer, according to an embodiment of the present invention.

FIG. 9 illustrates a quick disconnect electrical and nitrogen purge system of a deployer 900, according to an embodiment of the present invention. Nitrogen purge fitting 905 is configured to release nitrogen into deployer 900 such that nitrogen is allowed to flow into satellite 920, ensuring that satellite 920 remains clean while the deployer is resting on the launch pad. For example, a hose may connect to nitrogen purge fitting 905 to allow nitrogen to flow through deployer 900 and into satellite 920.

Also shown in FIG. 9 is a quick disconnect connector 910 configured to attach to satellite 920 for communication and/or power while deployer 900 rests on the launch pad. When satellite 920 is ejected from deployer 900, quick disconnect connector 910 disconnects from satellite 920.

Figure 10:
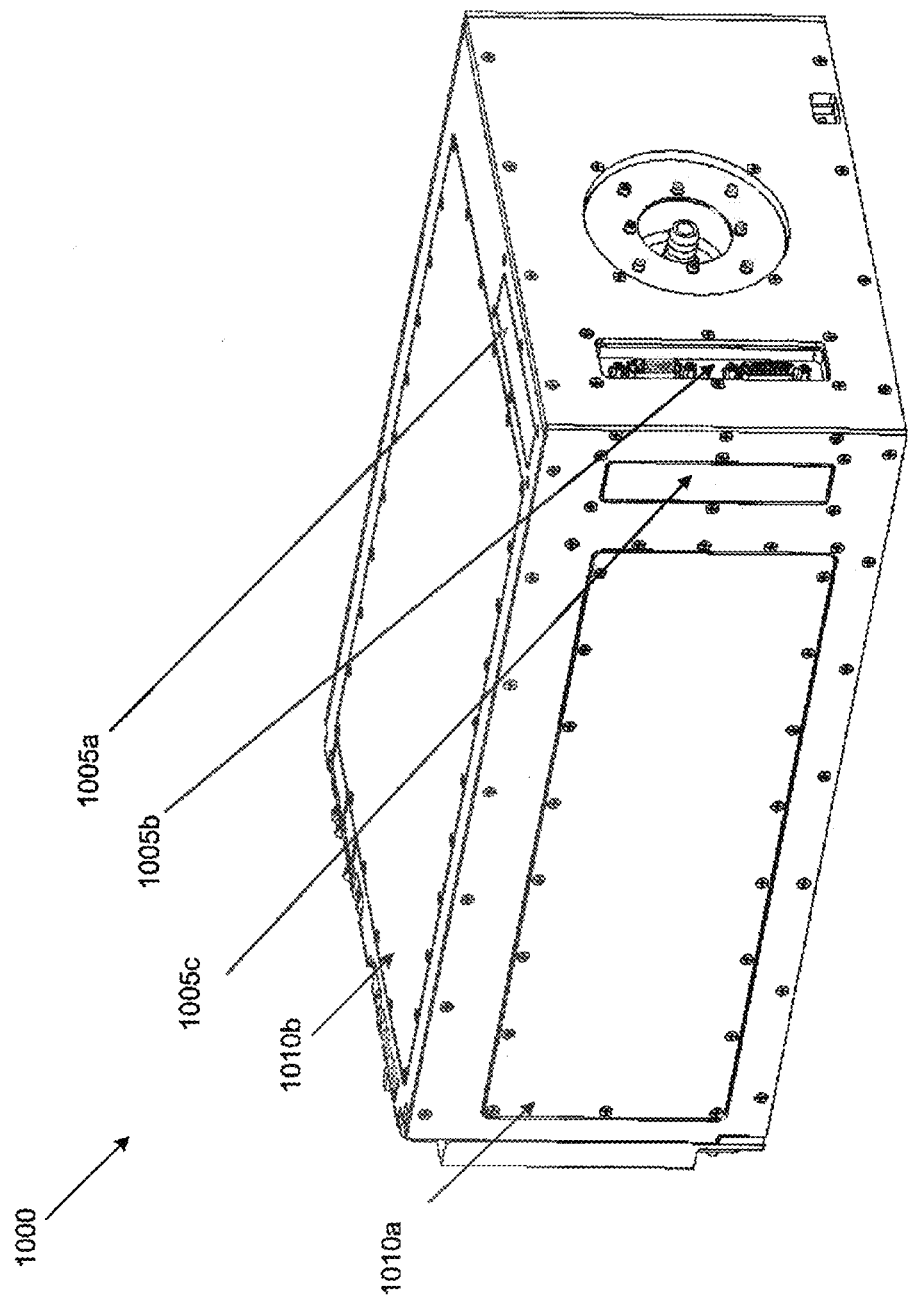
FIG. 10 illustrates a plurality of access doors for the deployer, according to an embodiment of the present invention.

An external connector 915 is also provided in this embodiment to interface to a power and signal source (i.e., launch vehicle) for deployer 900. For convenience purposes, external connector 915 may be situated in a plurality of locations (see side plates 1005a, 1005h, 1005c of FIG. 10). Also shown in FIG. 10 are access doors 1010a, 1010b on deployer 1000. Access doors 1010a, 1010b are configured to provide access to the components within deployer 1000.

Figure 11:
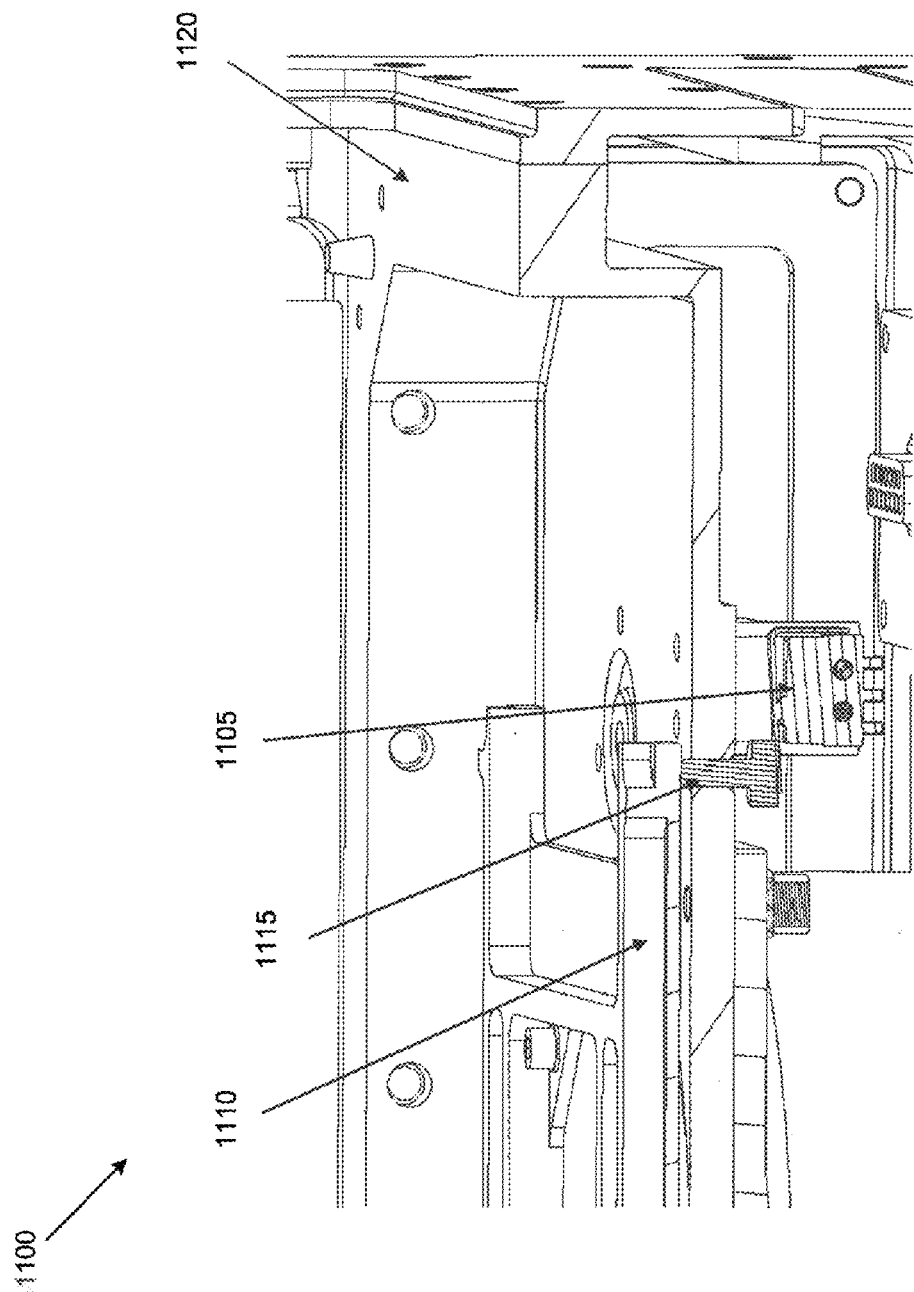
FIG. 11 illustrates a bottom plate switch system for the deployer, according to an embodiment of the present invention.

FIG. 11 illustrates a bottom plate switch system 1100 for the deployer, according to an embodiment of the present invention. In this embodiment, when the satellite rests against a contact surface 1120 of the deployer, switch 1105 is in a closed state due to the pressure exerted by pusher plate 1110 and pin 1115. When pusher plate 1110 starts to push the satellite out of the deployer, separation is achieved causing switch 1105 to move to an open state. Switch 1105 in this embodiment indicates that pusher plate 110 has moved and subsequently disengaged the satellite from the lower shear pins.

Figure 12A:
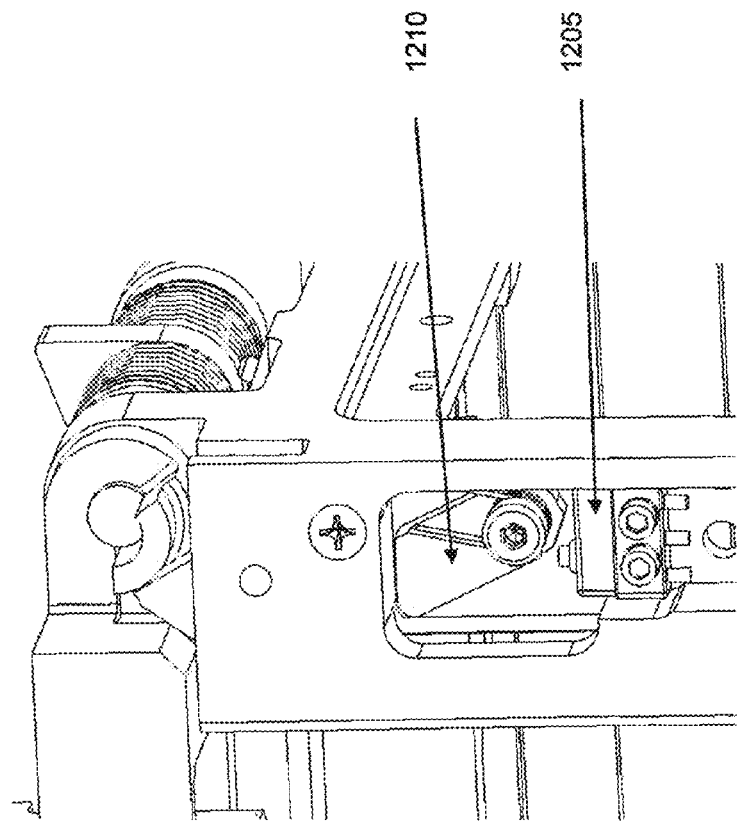

FIGS. 12A and 12B illustrate a rail stop switch system 1200 for the deployer, according to an embodiment of the present invention. In this embodiment, when switch 1205 is in an open state (FIG. 12A), rotating bar 1210 rests against the satellite. When the satellite has been deployed, that is, released from the deployer, rotating bar 1210 is configured to rotate to contact switch 1205 and place switch 1205 in a closed state. Switch 1205 in this embodiment indicates that the satellite has successfully left the deployer.

One or more embodiments of the present invention pertain to an apparatus that uses clamps in the axial direction with a preload and pins in the lateral direction with a preload to constrain a satellite. As a result, the satellite is prevented from moving or rattling during launch or flight.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for use with a satellite to be deployed in space, the apparatus comprising:
   a satellite to be deployed in space;
   at least one clamp bar configured to restrain the satellite to be deployed in space within the apparatus in an axial direction; and
   a plurality of pins configured to restrain the satellite within the apparatus in a lateral direction, wherein the plurality of pins comprises a set of upper satellite pins configured to protrude through a shear plate, the shear plate being connected to a door of the apparatus, the shear plate configured to connect the satellite to the apparatus, and a set of lower satellite pins configured to protrude through a lower plate of the apparatus to connect the apparatus with the satellite.

2. The apparatus of claim 1, wherein the at least one clamp bar is further configured to compress the satellite against a lower plate of the apparatus when a door of the apparatus is closed.

3. The apparatus of claim 1, wherein the plurality of pins comprises a set of door pins configured to connect a door of the apparatus with a compartment of the apparatus.

4. The apparatus of claim 1, the apparatus further comprising:
   a set of guide rails configured to guide the satellite in and out of the apparatus.

5. The apparatus of claim 1, the apparatus further comprising:
   a first set of torsion springs configured to open a door of the apparatus to a predefined degree; and
   a second set of torsion springs configured to slow down the door after the door reaches the predefined degree.

6. The apparatus of claim 5, the apparatus further comprising:
   a ratchet fitting configured to lock after every predefined number of degrees to prevent the door from contacting the satellite during deployment.

7. The apparatus of claim 5, the apparatus further comprising:
   a satellite lock configured to rotate from a lock state to an unlock state, and release the satellite from the apparatus when the door of the apparatus opens to the predefined degree.

8. An apparatus for use with a satellite to be deployed in space, the apparatus comprising:
   a satellite to be deployed in space;
   a plurality of clamp bars with a preload configured to constrain the satellite to be deployed in space within the apparatus in an axial direction;
   a plurality of upper and lower pins with a preload configured to constrain the satellite within the apparatus in a lateral direction; and
   a ratchet fitting configured to restrict a door from bouncing back as the door opens every predefined number of degrees.

9. The apparatus of claim 8, wherein the plurality of upper pins comprises a set of apparatus pins and a set of satellite pins.

10. The apparatus of claim 9, wherein, when a door of the apparatus is closed, the plurality of clamp bars are configured to compress the satellite against a lower plate of the apparatus, restricting movement in the axial direction.

11. The apparatus of claim 8, the apparatus further comprising:
    a first set of torsion springs configured to open a door of the apparatus to a predefined degree; and
    a second set of torsion springs configured to slow down the door after the door reaches the predefined degree.

12. The apparatus of claim 11, the apparatus further comprising:
    a satellite lock configured to rotate from a lock state to an unlock state, and release the satellite from the apparatus when the door of the apparatus opens to the predefined degree.

13. An apparatus with a satellite to be deployed in space, the apparatus comprising:
    a satellite to be deployed in space;
    a door, the door comprising a first set of torsion springs and a second set of torsion springs;
    a compartment configured to hold the satellite to be deployed in space, wherein the first set of torsion springs is configured to open the door to a predefined angle and the second set of torsion springs is configured to slow down the door to allow the satellite to be deployed from the apparatus; and
a ratchet fitting configured to restrict the door from bouncing back as the door opens every predefined number of degrees.

14. The apparatus of claim 13, the apparatus further comprising:
a satellite lock configured to rotate from a lock state to an unlock state, and release the satellite from the apparatus when the door of the apparatus opens to the predefined degree.

15. The apparatus of claim 13, the apparatus further comprising:
a release mechanism configured to release the door from the compartment of the apparatus.

16. The apparatus of claim 15, wherein the release mechanism comprises a pin puller and a latch.

17. The apparatus of claim 16, wherein the pin puller is configured to retract a pin in the release mechanism, causing the latch to release the door.

\* \* \* \* \*